United States Patent [19]

Maltby

[11] 4,416,416

[45] Nov. 22, 1983

[54] TWO-PORT THERMALLY RESPONSIVE VALVE

[75] Inventor: Edgar W. Maltby, Elgin, Ill.

[73] Assignee: Eaton Corporation, Cleveland, Ohio

[21] Appl. No.: 373,187

[22] Filed: Apr. 29, 1982

Related U.S. Application Data

[63] Continuation of Ser. No. 235,179, Feb. 17, 1981, abandoned, which is a continuation of Ser. No. 93,704, Nov. 13, 1979, abandoned.

[51] Int. Cl.³ ............................................. G05D 23/12
[52] U.S. Cl. ................................. 236/86; 137/625.26; 251/122; 251/214; 251/DIG. 1
[58] Field of Search ....................... 236/86, 99 K, 100; 251/321, 122, 214, DIG. 1; 137/625.26

[56] References Cited

U.S. PATENT DOCUMENTS

| | | | |
|---|---|---|---|
| 670,083 | 3/1901 | Osborne | 251/122 X |
| 941,703 | 11/1909 | Fitts | 251/122 X |
| 1,041,257 | 10/1912 | Ellis | 251/122 X |
| 3,289,694 | 12/1966 | Frye | 251/122 X |
| 3,512,550 | 5/1970 | Ammann | 251/122 X |
| 4,000,849 | 1/1977 | Wagner et al. | 251/100 |

FOREIGN PATENT DOCUMENTS 350520 11/1960 Fed. Rep. of Germany ...... 251/122
2424242 12/1974 Fed. Rep. of Germany ...... 236/100

Primary Examiner—Tapolcai, William E.
Attorney, Agent, or Firm—C. H. Grace; J. G. Lewis; R. A. Johnston

[57] ABSTRACT

A thermally responsive valve (10) for valving adjacent first (21) and second (22) fluid ports is disclosed which prevents harmful fuel vapors from adversely affecting the valve power element (12). An elongated valve member (82) is movably contained within a housing fluid chamber (18) and spring-biased toward a closed position whereupon a first seal ring (90) located around the valve member engages with a valve seating surface (70) located intermediate the two fluid ports. When predetermined temperatures are encountered, a thermally responsive power element (12) connected to the lower end of the valve housing overcomes the biasing force of the spring (106) and moves the valve member to an open position in which the valve surface is spaced from the valve seat, thereby permitting fluid communication between the two ports. A lower portion (104) of the valve member extends beyond the fluid chamber and abuts with an output rod (60) of the power element. A stationary seal ring (72) is mounted in a housing counterbore (76) and engages the periphery of the valve member lower portion for sealing the fluid chamber from the thermal power element.

11 Claims, 3 Drawing Figures

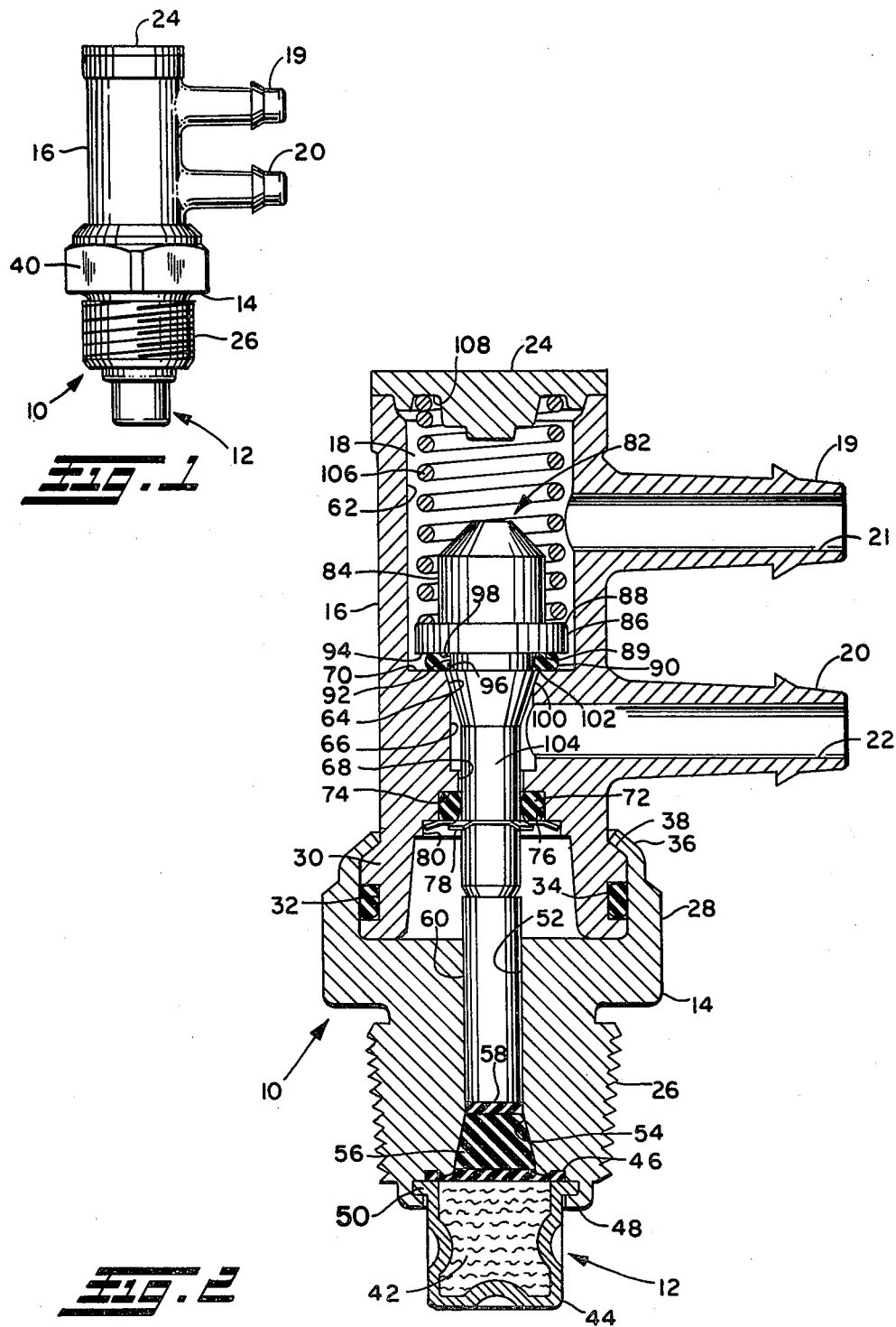

TWO-PORT THERMALLY RESPONSIVE VALVE

This is a continuation of application Ser. No. 235,179, filed Feb. 17, 1981, now abandoned which was a continuation of U.S. Ser. No. 93,704, filed Nov. 13, 1979, now abandoned.

BACKGROUND OF THE INVENTION

1. Field of the Invention

This invention relates to thermally responsive valves for use in pollution control systems for automotive internal combustion engines and is particularly suited for controlling the flow of stored fuel vapors from the engine fuel tank to the intake manifold.

2. Discussion of the Prior Art

Evaporator cannisters are presently being used to collect fuel vapors given off by the fuel in the vehicle fuel tank to prevent this form of pollution from entering the atmosphere. The evaporator cannister is one component of a fuel vapor recovery system which in some installations includes a solenoid valve for controlling vapor flow from the cannister to the engine intake manifold. The solenoid valve is opened a predetermined time after engine start-up in order to avoid introducing an excessively rich air-fuel mixture to the engine which causes poor engine performance. Although the solenoid valve type arrangement has been found functionally operative, it has long been desired to find a lower cost alternative to replace the solenoid valve and its associated control circuitry.

As an alternative to the electrically operated solenoid valve other known systems have incorporated a two port vacuum valve actuated by a suitable vacuum signal or a two port valve actuated by a thermally expansible wax-type power element. The performance of these valves upon exposure to prolonged service has been adversely affected by the degrading effects of the fuel vapors on the diaphragms and wax-type power elements.

SUMMARY OF THE INVENTION

In the present invention a thermally responsive two port pneumatic valve is provided which is resistant to the harmful effects of fuel vapors and which represents a significant cost savings over a conventional solenoid valve and its associated control circuitry. The present valve employs a unique valve member construction and sealing arrangement in the valve housing. The valve member has an elongated configuration with an upper portion extending into a fluid chamber defined by the valve housing and includes a flanged portion intermediate the two fluid ports which communicate with the fluid chamber. A unique seal ring mounting arrangement on the valve member includes an annular groove having an upper side wall formed by the lower surface of a flanged portion and a lower side wall having a reduced outer diameter. The groove depth is sufficient to retain an annular seal ring on the valve member yet shallow enough to permit the ring to seat against a valve seating surface defined by a shoulder extending inward radially beneath portions of the seal ring. The shoulder is integrally molded into the valve housing and disposed intermediate the two fluid ports. A downwardly converging conical portion is formed on the valve member and has a major diameter defined by and in common with the outer diameter of the groove lower side wall. This structural feature enables the effective flow area between the conical valve member portion and the internal wall of the fluid chamber beneath the valve seat to increase abruptly for a relatively small amount of axial valve member movement. The lower end of the valve member includes a portion having a reduced diameter which extends externally of the fluid chamber and into engagement with an output rod from the thermally responsive actuator.

A second seal ring is mounted in a bore in the housing exteriorly of the fluid chamber and held against a housing shoulder by a retaining washer. The second ring sealingly engages the outer surface of the reduced diameter portion of the valve member thereby fluidly sealing the valve chamber and preventing fuel vapors passing through the valve from escaping into the wax-base expansible material of the power element attached to the lower end of the valve assembly.

It is therefore an object of the invention to provide a thermally responsive valve which isolates harmful fuel vapors from the power element.

It is an object of the invention to provide a thermally responsive valve which is easy to assemble and low in cost.

It is an object of the invention to provide a low cost means for sealing a movable valve member within a fluid chamber adapted to be exposed to harmful fuel vapors.

It is another object of the invention to provide a valve having increasing transverse flow area past the movable valve member as the valve member is actuated to an open position.

These and other objects, features, and advantages of the present invention will be understood in greater detail from the following description and associated drawings.

BRIEF DESCRIPTION OF THE DRAWINGS

FIG. 1 is a plan view of a valve embodying the principles of the invention;

FIG. 2 is a cross-sectional view of the valve of FIG. 1 in the closed position.

DETAILED DESCRIPTION

Figure 3:
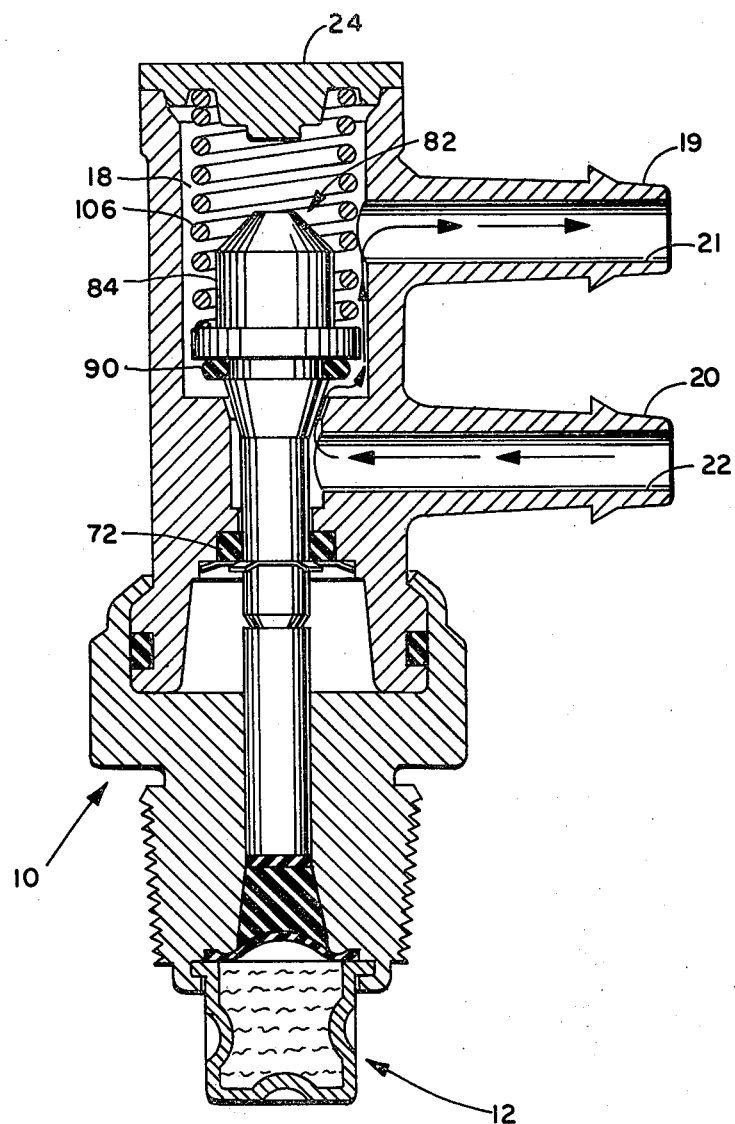
FIG. 3 is a cross-sectional view similar to FIG. 2 illustrating the valve in the open position.

Referring to FIG. 1 and FIG. 2, a thermally responsive vacuum valve, indicated generally by numeral 10, is shown as having a thermally responsive actuator, indicated generally by numeral 12, extending from an adapter 14. A housing 16 defines an internal fluid chamber 18. Upper and lower tubular projections 19 and 20 are integrally molded with housing 16. Fluid ports 21 and 22 are formed in projections 19 and 20, respectively, and are in fluid communication with chamber 18. A disc shaped end cap 24 is seated on the upper end of housing 16 and closes off the upper end of chamber 18. In the presently preferred practice, housing 16 and end cap 24 are preferably injection molded from a suitable reinforced plastic material, such as a glass filled nylon, and are joined together and sealed against fluid leakage by any suitable means, as for example, sonic welding.

Adapter 14 has a tapered pipe thread 2 at one end and is attached to the bottom end of housing section 16 for permitting assembly of the valve to the apparatus from which a medium is to be sensed as, for example, on an engine block for sensing the temperature of the engine coolant. Housing 16 is free to rotate relative to the adapter 14 thereby permitting alignment of the fluid ports after installation to any desired position.

A relatively thin wall tubular projection 28 is formed on the upper end of the adapter 14 and has located and received therein the lower end of housing section 16. A thickened cylindrical wall portion 30 is formed on the lower end of the housing 16 and has an annular groove 32 formed therein in which is received a seal ring 34. Seal ring 34 provides a dynamic seal between adapter 14 and housing 16. An upper portion 36 of tubular projection 28 has a wall thickness suitable for crimping. A tapered surface 38 is provided on housing 16. Upper portion 36 is crimped over surface 38 an amount sufficient to locate and retain the housing in the adapter, but still allow relative rotation therebetween. The upper exterior surface of adapter 14 is provided with a hexagonal pattern of wrench flats 40 to facilitate valve installation.

Thermally responsive actuator 12 includes a volumetrically thermally responsive material 42 disposed within a retaining cup 44 which is preferably formed from mild steel and attached to the lower end of adapter 14. Material 42 is of any suitable type well known in the art as, for example, a mixture of wax and copper metallic flakes. The mixture is enclosed in the cup by a flexible, elastomeric diaphragm 46. A thin walled annular portion 48 is formed on the lower end of adapter 14 and is deformed over a flange 50 provided on the periphery of retaining cup 44. The holding force of the crimped portion 48 seals diaphragm 46 against the top surface of the retaining cup and the lower face of the adapter, thus confining the wax material 42.

Adapter 14 may be fabricated from steel or other suitable material as, for example, brass, and has a centrally located bore 52 located therethrough and a tapered counterbore 54 located at the lower end of the adapter. A plug 56 conformes generally to the space defined by tapered counterbore 54 and is received therein. A disc-shaped spacer 58 is received in bore 52 and registers against the upper surface of plug 56. Diaphragm 46, plug 54, and space 58 are all formed from a suitable elastomer which is compatible with the wax-metal flake mixture and suitable for service exposure to the temperatures encountered during engine cooling system operating conditions.

A rod 60, preferably fabricated from aluminum, is slidably received within bore 52 and has a lower end in contact with spacer 58 and an upper end extending into housing 16.

Fluid chamber 18 is defined in part by adjacent bores 62, 64, 66, and 68. A shoulder 70 connects bore 62 and bore 64, which is tapered, and is also designated as a valve seat.

A seal ring 72 is seated against a shoulder 74 which connects bore 68 with a counterbore 76. A resilient retaining clip 78 maintains seal ring 72 against shoulder 74. The outer diameter of the retaining clip as measured across the outer diameter of its radially extending legs exceeds the internal diameter of a counterbore 80 located immediately below counterbore 76, thus allowing the leg tips to "bite" into the softer plastic housing surface.

A valve member, indicated generally by reference numeral 82, is received in fluid chamber 18 and includes an enlarged upper diameter portion 84, and a flanged portion 86 which has an upper transverse seating face 88 and a lower transverse surface 89.

A seal ring 90 is mounted in an annular groove 92 and is movable with valve member 82. Groove 92 is defined by an upper transverse wall 94, a lower transverse wall 96, and a cylindrical surface 98 connecting walls 94 and 96. By sizing the outer diameter of wall 96 to achieve a shallow groove depth, the lower surface of seal ring 90 is made to sealingly and positively abut shoulder 70 thereby fluidly isolating fluid port 21 from fluid port 22 while the valve member 82 is in the closed position as shown by FIG. 2.

Valve member 82 includes a conical surface portion 100 having an upper major diameter 102 defined by the outer diameter of lower transverse wall 96 and a lower minor diameter portion 104. The reduced minor diameter surface portion 104 extends past the lower portion of fluid chamber 18 and sealingly engages with internal surface portions of seal ring 72. A central opening (not shown) in retaining clip 78 allows portion 104 to extend therethrough. The lower end of valve member 82 is maintained in abutment with the upper end of rod 60 by a compression biasing spring 106 which has its upper end received in an annular centering groove 108 formed in the lower surface of end cap 24 and its lower end seated against seating surface face 88 of flanged portion 86. Upper portion 84 assists in centering spring 10 on the valve member.

In operation, at sensed temperatures less than a predetermined minimum value valve member 82 is biased downwardly relative to FIG. 2 by spring 106 to a closed position, wherein seal ring 90 is compressed between the upper transverse wall 94 and shoulder 70, thereby fluidly isolating upper fluid port 21 from lower fluid port 22. Seal ring 72 fluidly isolates the lower portion of chamber 18 defined by bores 64, 66, and 68 from the internal space between adapter 14 and lower surface of housing 16. While the valve member is in the closed position, the thermally responsive actuator 12 is inactive since the temperatures sensed are below those necessary to cause an abrupt volumetric increase in the wax and metal flake material 42.

Referring now to FIG. 3, valve 10 is shown in the open position with valve member 82 moved upwardly by the thermally responsive actuator 12 which is sensing temperatures above the value which results in an abrupt volumetric increase of the wax and copper flake material 42. Valve member 82 has now moved upward an amount sufficient to space seal ring 90 from shoulder 70, thereby permitting fluid communication between upper fluid port 21 and lower fluid port 22 by way of fluid chamber 18. Fluid communication between ports 22 and 21 follows the path indicated generally by the black arrows of FIG. 3.

It should be noted that as valve member 82 moves upwardly, the effective flow area between housing tapered bore 64 and tapered conical portion 100 of valve member 82 increases an amount proportional to valve member travel, whereas cylindrical surfaces at that location would not provide this feature.

Seal ring 72 continues to function as an isolating means for preventing harmful vapors from escaping fluid chamber 18 and penetrating into the area around thermal actuator 12 by flowing past the clearance between rod 60 and bore 52 and also past diaphragm 46, plug 56 and spacer 58.

When sensed temperatures are again below the predetermined range, the volume of the material 42 will contract permitting the spring 106 to return valve member 82 to the closed position as shown in FIG. 2, thereby once again isolating upper fluid port 21 from lower fluid port 22.

The embodiment of the invention as shown and described above is representative of the inventive principles stated therein. It is to be understood that variations and departures can be made from the embodiments as shown without, however, departing from the scope of the appended claims.

What is claimed is:

1. A thermally responsive valve comprising:
  housing means defining,
    (i) first and second fluid ports,
    (ii) a fluid chamber communicating with said ports,
    (iii) tapered valve seat means, and
    (iv) a seal engaging surface disposed within said fluid chamber intermediate said ports;
  a valve member disposed within said housing for displacement between first and second positions for selectively establishing communication between said ports, said valve member defining,
    (i) seal receiving means disposed within said fluid chamber,
    (ii) a tapered valve surface engageable with said valve seat means when said valve member is in said first position to limit displacement thereof in one axial direction, and
    (iii) a portion extending exteriorly of said fluid chamber;
  a compliant seal carried with said valve member by said seal receiving means, and engageable with said seal engaging surface for limited axial compression of said seal when said valve member is in said first position, said seal being axially displaced from said seal engaging surface when said valve member is in said second position;
  means biasing said valve member to said first position;
  seal means disposed intermediate said exteriorly extending portion and said housing to effect continuous sealing engagement therebetween to fluidly isolate said fluid chamber; and
  thermally responsive means engaging said exteriorly extending portion and operative to displace said valve member between said first and second positions in responsive to sensing predetermined temperatures,
  said seal receiving means comprising an annular groove formed within said valve member, said groove defined by an upper transverse wall portion, a lower transverse wall portion, and a cylindrical surface portion connecting said upper and lower wall portions,
  said compliant seal comprising a seal ring received in said annular groove and having a radial thickness substantially greater than the radial thickness of said lower transverse wall portion, and
  said seal engaging surface including an annular shoulder extending inward radially beneath portions of said compliant seal ring such that in said first position, said compliant seal ring sealingly abuts thereagainst.

2. The valve of claim 1, wherein said seal means comprises a seal ring carried by said housing means and including surface portions thereof slidably engaging said exteriorly extending portion.

3. The valve of claim 2, wherein
  (i) said housing means defines a bore through which said exteriorly extending portion extends,
  (ii) said bore defines an annular recess disposed about the inner periphery thereof,
  (iii) said seal ring is disposed in sealing engagement with said recess, and
  (iv) said housing means includes discrete retaining means engaging portions of the structure thereof for maintaining said seal ring within said annular recess.

4. The valve of claim 1, wherein said thermally responsive means is rigidly affixed to said housing means.

5. The valve of claim 1, wherein said valve seat means and said valve surface are disposed within said fluid chamber axially adjacent said seal engaging surface and valve surface, respectively.

6. The valve of claim 5, wherein said tapered valve surface has a major diameter defined by the outer edge of said lower transverse wall portion, and a minor diameter in common with said exteriorly extending portion.

7. The valve of claim 6, wherein said valve surface is continuously conically converging intermediate said major and minor diameters.

8. The valve of claim 1, wherein said valve seat means and said valve surface are relatively noncompliant.

9. The valve of claim 1, wherein said valve is open for fluid communication between said ports through said fluid chamber when said valve member is in said second position, and closed to interrupt fluid communication between said ports through said fluid chamber when said valve member is in said first position.

10. The valve of claim 1, wherein said valve seat means and said valve surface are disposed within said fluid chamber intermediate said ports.

11. The valve of claim 1, wherein said valve member comprises a one-piece design.

* * * * *